US012786662B2

(12) United States Patent
Smith

(10) Patent No.: US 12,786,662 B2
(45) **Date of Patent: *Nov. 3, 2026**

(54) SYSTEMS AND METHODS FOR DETERMINING A VEHICLE DRIVER USING AT LEAST PEER-TO-PEER NETWORK SIGNALS

(71) Applicant: Quanata, LLC, San Francisco, CA (US)

(72) Inventor: Bennett Smith, Inver Grove, MN (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,093

(22) Filed: Aug. 11, 2024

(65) Prior Publication Data

US 2024/0406674 A1 Dec. 5, 2024

Related U.S. Application Data

(63) Continuation of application No. 18/204,737, filed on Jun. 1, 2023, now Pat. No. 12,063,570, which is a continuation of application No. 17/670,339, filed on Feb. 11, 2022, now Pat. No. 11,700,506, which is a continuation-in-part of application No. 17/100,118, filed on Nov. 20, 2020, now Pat. No. 11,252,532, which is a continuation of application No. 16/736,094, filed on Jan. 7, 2020, now Pat. No. 10,880,686.

(51) Int. Cl.

| | |
|---|---|
| ***H04W 4/02*** | (2018.01) |
| ***G01S 15/74*** | (2006.01) |
| ***H04W 4/40*** | (2018.01) |
| ***H04W 4/80*** | (2018.01) |
| ***H04W 76/14*** | (2018.01) |

(52) U.S. Cl.

CPC ............. *H04W 4/023* (2013.01); *G01S 15/74* (2013.01); *H04W 4/40* (2018.02); *H04W 4/80* (2018.02); *H04W 76/14* (2018.02)

(58) Field of Classification Search

CPC ......... H04W 4/023; H04W 4/80; H04W 4/40; H04W 76/14; G01S 15/74; G06Q 40/08

See application file for complete search history.

(56) References Cited

U.S. PATENT DOCUMENTS

| | | | | |
|---|---|---|---|---|
| 7,181,229 | B2 * | 2/2007 | Singh ...................... | H04W 4/30 455/565 |
| 7,856,203 | B2 * | 12/2010 | Lipovski ........... | H04M 1/72436 455/418 |
| 7,887,089 | B2 * | 2/2011 | Breed ............... | B60R 21/01542 701/45 |

(Continued)

*Primary Examiner* — Lewis G West

(74) *Attorney, Agent, or Firm* — BRYAN CAVE LEIGHTON PAISNER LLP

(57) ABSTRACT

A computer-implemented method for identifying occupants of a vehicle, the computer-implemented method including: receiving, using a sensor associated with a first user device of a first vehicle occupant in the vehicle, an echo signal associated with a first ping signal emitted by the first user device; generating a first relative positioning map based upon the echo signal; and determining that the first vehicle occupant is a driver or a passenger of the vehicle based at least in part upon the first relative positioning map.

20 Claims, 6 Drawing Sheets

(56) References Cited

U.S. PATENT DOCUMENTS

| | | | | |
|---|---|---|---|---|
| 8,336,664 | B2 | 12/2012 | Wallace et al. | |
| 9,201,932 | B2 | 12/2015 | Silver et al. | |
| 9,369,196 | B2 * | 6/2016 | Hannon | B60K 35/10 |
| 9,674,337 | B2 * | 6/2017 | James | H04W 4/42 |
| 10,134,091 | B2 | 11/2018 | Adams et al. | |
| 10,205,819 | B2 * | 2/2019 | Hannon | H04W 4/023 |
| 10,580,084 | B1 * | 3/2020 | Davis | H04W 4/20 |
| 10,880,686 | B1 * | 12/2020 | Smith | H04W 4/023 |
| 11,252,532 | B2 * | 2/2022 | Smith | H04W 76/14 |
| 11,573,678 | B2 * | 2/2023 | Dazé | G06F 3/0482 |
| 11,700,506 | B2 * | 7/2023 | Smith | G01S 15/89<br>455/41.2 |
| 12,063,570 | B2 * | 8/2024 | Smith | G01S 15/89 |
| 2011/0304446 | A1 * | 12/2011 | Basson | H04W 48/04<br>340/5.82 |
| 2013/0084847 | A1 * | 4/2013 | Tibbitts | H04M 1/72463<br>455/419 |
| 2013/0336094 | A1 * | 12/2013 | Gruteser | G01S 11/14<br>367/117 |
| 2014/0266789 | A1 | 9/2014 | Matus | |
| 2014/0335902 | A1 * | 11/2014 | Guba | H04W 4/027<br>381/86 |
| 2015/0043309 | A1 * | 2/2015 | Calvarese | G01S 1/80<br>367/117 |
| 2015/0120336 | A1 | 4/2015 | Grokop et al. | |
| 2015/0149042 | A1 * | 5/2015 | Cooper | B60R 25/245<br>701/48 |
| 2016/0266235 | A1 * | 9/2016 | Hannon | H04M 1/72457 |
| 2017/0019525 | A1 * | 1/2017 | Hannon | G01S 1/752 |
| 2017/0322287 | A1 * | 11/2017 | Benbouhout | B60R 25/24 |
| 2018/0252796 | A1 * | 9/2018 | Qu | G01S 5/26 |
| 2019/0025402 | A1 * | 1/2019 | Qu | G01S 11/14 |

* cited by examiner

SYSTEMS AND METHODS FOR DETERMINING A VEHICLE DRIVER USING AT LEAST PEER-TO-PEER NETWORK SIGNALS

CROSS-REFERENCE TO RELATED APPLICATIONS

This application is a continuation of U.S. patent application Ser. No. 18/204,737, filed Jun. 1, 2023, which is a continuation of U.S. patent application Ser. No. 17/670,339, filed Feb. 11, 2022, patented as U.S. Pat. No. 11,700,506, which is a continuation-in-part of U.S. patent application Ser. No. 17/100,118, filed Nov. 20, 2020, patented as U.S. Pat. No. 11,252,532, which is a continuation of U.S. patent application Ser. No. 16/736,094, filed Jan. 7, 2020, patented as U.S. Patent Application No. 10,880,686, each of which are hereby incorporated by reference in their entirety.

FIELD OF THE INVENTION

The present disclosure relates to determining a driver of a vehicle, and more particularly, to network-based systems and methods for identifying a vehicle driver based at least in part upon signals exchanged between user computing devices within a vehicle for a given trip.

BACKGROUND

Satellite navigation systems such as global positioning system (GPS) utilize satellites to provide geo-spatial positioning for a variety of applications. A GPS-equipped device may provide a location of the device with respect to, for example, a geographic coordinate system and/or geographic landmarks (e.g., streets, political entities, points of interest, etc.). Current GPS-equipped devices are generally not capable of determining the exact location of the device, but rather provide an estimate of the device's current location subject to some degree of error. For example, atmospheric effects (e.g., ionospheric delay) and/or artificial interference (e.g., a presence of metal and/or electromagnetic devices) may introduce error to a GPS-based determination of location. Furthermore, when a number of GPS-equipped devices are in close proximity to one another, such as, for example, in a vehicle, the GPS data obtained from each device may not accurately reflect the relative position of each device in the vehicle.

In some cases, a vehicle driver's driving behavior is monitored for insurance purposes (e.g., automobile insurance discounts), safety purposes, and/or usage-based purposes. Telematics data from telematics sensors (e.g., associated with a mobile device) may be collected for trips taken by a driver. However, in cases where a driver is accompanied by one or more passengers, known systems that primarily rely on GPS data to identify the driver may oftentimes incorrectly identify a passenger as the driver. In these cases, misidentifying a passenger as the vehicle driver for a trip may affect both the driver and the passenger of the vehicle when the driving tendencies determined by analyzing the telematics data for the trip are incorrectly attributed to the wrong vehicle occupant (e.g., driver, passenger). When multiple vehicle occupants travel together in a single vehicle, currently available GPS technology lacks the precision to correctly identify the actual vehicle driver and the passenger(s) for a given trip based primarily upon measured geographic coordinates alone. Thus, there exists a need for vehicle occupants (e.g., a driver and passengers) to automatically be identified, with precision, as either a vehicle driver or a vehicle passenger for a given trip.

BRIEF SUMMARY

The present embodiments may relate to, inter alia, systems and methods for identifying a driver of a trip when multiple people (e.g., vehicle occupants or users) are traveling together in a vehicle. In the exemplary embodiment, a driver identification ("DI") computer system is utilized to identify a driver of a trip. Embodiments of the present disclosure may use non-audible sonic pings (e.g., non-audible sonic ping signals) emitted from and detected by user computing devices to determine a spatial map of the user computing devices and therefrom determine the driver of the vehicle for a trip. DI computer system may include a driver identification ("DI") server in communication with a plurality of user computing devices associated with vehicle occupants within the vehicle. User computing devices may be registered with the DI server. Each user computing device may execute thereon a driver identification ("DI") telematics application ("app") provided by the DI server. The DI application may enable user computing devices within the vehicle to detect (a) when a trip has started and (b) the presence of another user computing device inside the vehicle with the app executed thereon. During the trip, each user computing device may emit and detect a series of non-audible sonic pings (e.g., non-audible sonic ping signals) as part of a ping exchange process (e.g., ping signal exchange process). Ping data associated with the ping exchange process may be utilized by each user computing device to generate a spatial map (e.g., a relative positioning map) of each device's position within the vehicle.

In one aspect, a user computing device for identifying a driver of a vehicle on a trip is provided. The user computing device is associated with a first vehicle occupant. The user computing device may include at least one processor in communication with a memory device. The at least one processor may be programmed to (i) detect a second user computing device associated with a second vehicle occupant, (ii) initiate a ping exchange process including emitting a set of non-audible sonic ping signals and detecting a set of non-audible sonic ping signals over a duration of the trip, (iii) generate a relative positioning map of the user computing device with respect to the second user computing device, the relative positioning map including a first position associated with the first vehicle occupant and a second position associated with the second vehicle occupant, (iv) determine, based upon the generated relative positioning map, that the first vehicle occupant is one of the driver and a passenger of the vehicle for the trip, and/or (v) transmit, to a driver identification ("DI") server, a trip report including the determination and the generated relative positioning map. The computer system may include additional, less, or alternate functionality, including that discussed elsewhere herein.

In another aspect, a computer-implemented method for identifying a driver of a vehicle on a trip using a user computing device is provided. The user computing device may be associated with a first vehicle occupant. The user computing device may include at least one processor in communication with a memory device. The method may include (i) detecting, by the user computing device, a second user computing device associated with a second vehicle occupant, (ii) initiating a ping exchange process including emitting a set of non-audible sonic ping signals and detecting a set of non-audible sonic ping signals by the user computing device over a duration of the trip, (iii) generating, by the user computing device, a relative positioning map of the user computing device with respect to the second user computing device, the relative positioning map including a first position associated with the first vehicle occupant and a second position associated with the second vehicle occupant, (iv) determining, by the user computing device, based upon the generated relative positioning map, that the first vehicle occupant is one of the driver and a passenger of the vehicle for the trip, and/or (v) transmitting, by the user computing device, to a driver identification ("DI") server, a trip report including the determination and the generated relative positioning map. The method may include additional, less, or alternate functionality, including those discussed elsewhere herein.

In a further aspect, a driver identification ("DP") server for identifying a driver of a vehicle on a trip is provided. The DI server may include at least one processor in communication with a memory device. The at least one processor may be programmed to (i) detect, within the vehicle, a first user computing device associated with a first vehicle occupant and a second user computing device associated with a second vehicle occupant, (ii) initiate a ping exchange process by instructing the detected user computing devices to (a) emit a set of non-audible sonic ping signals and (b) detect a set of non-audible sonic ping signals over a duration of the trip, (iii) receive ping data associated with the ping exchange process from both the first user computing device and the second user computing device, (iv) generate a relative positioning map of the first user computing device with respect to the second user computing device, the relative positioning map including a first position associated with the first vehicle occupant and a second position associated with the second vehicle occupant, and/or (v) determine, based upon the generated relative positioning map, that the first vehicle occupant is one of a driver and a passenger of the vehicle for the trip. The server may include additional, less, or alternate actions, including those discussed elsewhere herein.

Some embodiments include a computer-implemented method for identifying occupants of a vehicle. The computer-implemented method includes receiving, using a sensor associated with a first user device of a first vehicle occupant in the vehicle, an echo signal associated with a first ping signal emitted by the first user device. The computer-implemented method also includes generating a first relative positioning map based upon the echo signal. The computer-implemented method further includes determining that the first vehicle occupant is a driver or a passenger of the vehicle based at least in part upon the first relative positioning map.

Various embodiments include a system comprising one or more processors and one or more non-transitory computer-readable media storing computing instructions that, when executed on the one or more processors, cause the one or more processors to perform operations. The operations can include receiving, using a sensor associated with a first user device of a first vehicle occupant in a vehicle, an echo signal associated with a first ping signal emitted by the first user device. The operations also can include generating a first relative positioning map based upon the echo signal. The operations further can include determining that the first vehicle occupant is a driver or a passenger of the vehicle based at least in part upon the first relative positioning map.

A number of embodiments can include one or more non-transitory computer-readable media storing computing instructions that, when executed by one or more processors, cause the one or more processors to perform operations. The operations can include receiving, using a sensor associated with a first user device of a first vehicle occupant in a vehicle, an echo signal associated with a first ping signal emitted by the first user device. The operations also can include generating a first relative positioning map based upon the echo signal. The operations further can include determining that the first vehicle occupant is a driver or a passenger of the vehicle based at least in part upon the first relative positioning map.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
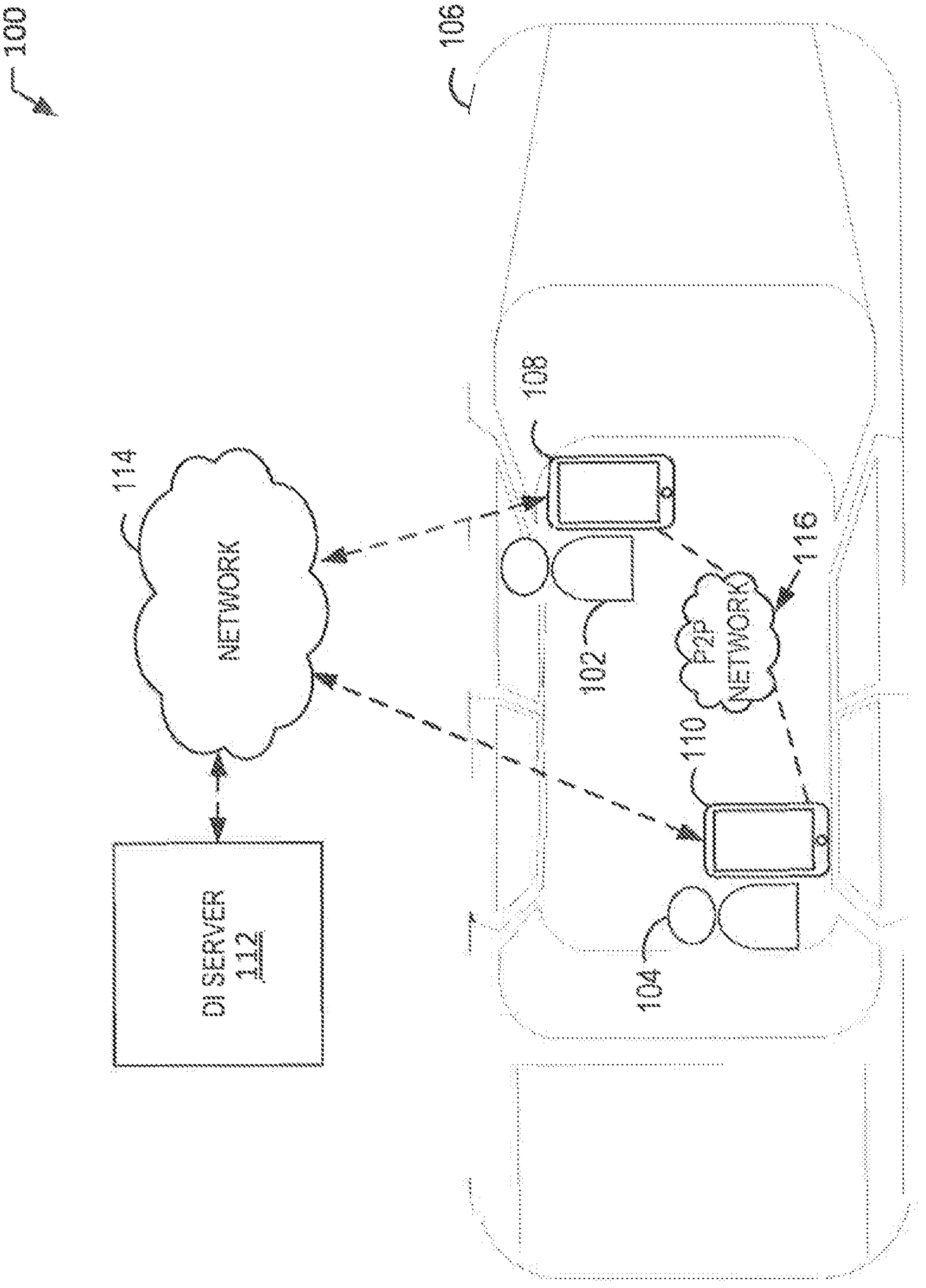
FIG. 1 illustrates an exemplary vehicle environment in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for identifying a driver of a vehicle on a trip. Embodiments of the present disclosure may use non-audible sonic pings (e.g., non-audible sonic ping signals) emitted from and detected by user computing devices to determine a spatial map of the user computing devices and therefrom determine the driver of the vehicle for a trip. The non-audible sonic pings exchanged between the user computing devices may be high frequency sounds that can be detected by a user computing device's microphone, but are inaudible to humans (e.g., humans can hear up to 20 kiloHertz ("kHz")) or near the limits of human perception (e.g., 18-20 kHz). In other embodiments, the pings exchanged between the user computing devices may be in the 20-22 kHz frequency range. In the exemplary embodiment, a driver identification ("DP") computer system is utilized to identify a driver of a trip. The DI computer system may include a driver identification ("DP") server in communication with a plurality of user computing devices (e.g., user mobile devices) associated with vehicle occupants (e.g., users) within the vehicle.

Vehicle occupants, such as a first vehicle occupant and a second vehicle occupant, are associated with corresponding user computing devices. In the example embodiment, the user computing device of each vehicle occupant includes a driver identification ("DI") telematics application ("app") that may be downloadable from the DI server so that the app can be executed on the user computing devices. The DI app, which includes computer-executable instructions that can be executed by the user computing devices, enables each respective user computing device to track, for each trip, telematics data as well as relative positioning data of each user computing device with respect to each other user computing device. Telematics data may include data associated with driving characteristics of a vehicle driver. Telematics data may be collected by one or more sensors mounted on or installed within a user computing device and/or within the vehicle. The collected telematics data may include vehicle speed, cornering, heading, direction, deceleration, braking and/or acceleration data, vehicle mileage, navigation data, and the like. In some embodiments, the telematics data may be used for insurance purposes (e.g., to set usage-based insurance rates and/or to provide insurance rate discounts for good driving behavior). Accordingly, when multiple vehicle occupants are in a vehicle, it is often needed that the telematics data is correctly associated with the driver. "App," as used herein, may refer generally to a software application installed and downloaded on a user interface of a user computing device associated with one or more vehicle occupants.

During a trip, the user computing devices within the vehicle establish a local peer-to-peer ("P2P") network with one another to measure time in flight of the non-audible sonic ping signals emitted by the user computing devices. In the example embodiment, the user computing devices coordinate over the P2P network to establish the timing for emitting the non-audible sonic ping signals and the frequencies that each device will emit for a given trip. Each user computing device participating in the P2P network may emit non-audible sonic ping signals at a frequency (or a set of frequencies) that is different from one another for the duration of a trip. In the example embodiment, user computing devices may listen for non-audible sonic ping signals from the other user computing devices participating in the P2P network. Each user computing device may subsequently record the frequency and the time associated with each detected non-audible sonic ping signal to generate a spatial map (e.g., a relative positioning map) of each device's position within the vehicle.

"P2P network," as described herein refers to a separate and distinct network from networks with a centralized access point, such as cellular networks. Rather, in P2P networks, devices connect directly to each other without the need for a centralized access point. In the exemplary embodiment, the user computing devices associated with the vehicle occupants may establish a P2P network connection with one another over BLUETOOTH™ Low Energy (e.g., BLE), Wi-Fi, such as ad hoc Wi-Fi and Wi-Fi Direct®, and the like. Ad hoc Wi-Fi and Wi-Fi Direct® enables devices to establish a direct peer-to-peer connection with one another and communicate directly over Wi-Fi signals.

In the exemplary embodiment, the user computing devices associated with the vehicle occupants may detect when a trip has started, as well as the presence of another user computing device having the DI app executed thereon. The user computing devices may automatically attempt to establish a near field communication ("NFC") with each other user computing device that has the DI application executed thereon to coordinate a ping exchange process (e.g., ping signal exchange process). In some embodiments, the user computing devices may be configured to periodically scan for NFC signals, such as BLE signals from nearby devices. In some embodiments, the user computing devices may be configured to run scans in the background for BLE signals from other user computing devices.

In one example, a first user computing device associated with a first vehicle occupant may detect that a trip has started and that a second user computing device associated with a second vehicle occupant is nearby. Upon detection, the first user computing device may attempt to establish a P2P network connection with the second user computing device over BLE through a standard BLE connection procedure. Once a P2P network connection is established, the first user computing device may transmit a message to the second user computing device, requesting that the second user computing device initiate the ping exchange process. In further embodiments, the first user computing device may automatically initiate the ping exchange process upon establishing the P2P network connection.

In further embodiments, the second user computing device may also transmit a request to the first user computing device, requesting the first user computing device to initiate the ping exchange process. In embodiments where attempts to establish a P2P network connection over BLE are unsuccessful, the user computing devices described herein are programmed to establish a P2P network connection over Wi-Fi. For example, after an unsuccessful attempt to establish a P2P network connection over BLE, the first user computing device may transmit a request over Wi-Fi to the second user computing device in an attempt to establish a Wi-Fi P2P network connection. In the exemplary embodiment, establishing a P2P network connection over BLE is preferred when possible to conserve power and battery life of user computing devices throughout the trip.

In the exemplary embodiment, each user computing device of the vehicle occupants records ping data regarding the non-audible sonic pings exchanged back and forth between the user computing devices (e.g., in the ping exchange process). In the exemplary embodiment, the non-audible sonic pings exchanged between the user computing devices are high frequency sounds configured to be detected by a microphone associated with each user computing device. During a trip, a set of non-audible sonic ping signals are emitted by each user computing device. A user computing device participating in the P2P network may start emitting non-audible sonic pings when the user computing device detects that a trip has started. In some embodiments, the emission of each ping signal may be spaced apart over a predetermined time interval throughout the duration of the trip. Thus, during a trip, as the first user computing device emits a ping signal for detection by the second user computing device, the first user computing device may also detect a ping signal emitted by the second user computing device.

The ping data may be recorded by each user computing device and subsequently utilized to generate respective spatial maps. In the exemplary embodiment, each user computing device utilizes the recorded ping data to generate a spatial map of the relative position of the respective user computing device in relation to the other user computing devices in the vehicle. Each user computing device may also track and record location data (e.g., Global Positioning System (GPS) data), accelerometer data, and/or gyroscope data associated with each user computing device.

"Ping data," as used herein includes data that is specific to each user computing device that takes part in the ping exchange process. Ping data may include information, such as a time stamp associated with the start of the exchange process, the number and/or sets of ping signals transmitted and received between the user computing devices taking part in the ping exchange process, the time interval between each ping signal transmitted and received, and the Doppler effect (e.g., a sudden change in the frequency of sound as the user computing devices are moved toward or away from each other). In the exemplary embodiment, each user computing device may be programmed to detect and take into account Doppler shifts due to, for example, movement or position changes of the vehicle occupants and/or the user computing devices associated with the vehicle occupants.

For example, vehicle occupants may pick up their user computing device and set their device down in a different orientation, such that the device's microphone is facing up or down. The orientation of a device's microphone may affect the manner in which ping signal are detected. In these events, the user computing devices may compare the time it takes for a particular user computing device to detect a ping signal with the time it should have taken the user computing device to detect the ping signal based upon the known timing intervals of each emitted ping signal.

In the exemplary embodiment, using the ping data, the first user computing device associated with the first vehicle occupant generates a spatial map of a position of the first vehicle occupant relative to a position of the second vehicle occupant. Using the generated spatial map, the first user computing device may determine that the likelihood of the first vehicle occupant being the driver is substantially high. For example, the first user computing device may determine that the first vehicle occupant is likely the driver when, based upon the exchanged ping signals, the user computing device is mapped near an area generally regarded as the driver's seat. In some embodiments, information regarding the vehicle's interior layout may be utilized to determine, based upon the exchanged ping signals, which vehicle occupant is the driver. For example, in one embodiment, a sound clip of the vehicle obtained when the vehicle starts up may be used to identify the vehicle make and model. This information may be used to retrieve a vehicle interior outline (e.g., template) of the vehicle's interior. In other embodiments, information regarding the vehicle's seat measurements and interior layout may be used to generate the spatial map. The spatial map may identify an approximate position of a user computing device relative to the other user computing device(s) within the vehicle for a given trip.

In some embodiments, the first user computing device may generate a confidence factor (e.g., a confidence level) associated with this determination. At the end of the trip, the first user computing device may transmit, via the DI application, to the DI server, a trip report that includes the generated spatial map, the determination that the first vehicle occupant is likely the driver, the confidence factor associated with this determination (e.g., "90% certain that user A was the driver of the vehicle during this trip"), and corresponding trip data. "Trip data," as described herein may include ping data, GPS data, accelerometer data, gyroscope data, and additional telematics data. Trip data may also include vehicle sound data, such as a short audio clip of the vehicle when the vehicle starts up at the beginning of the trip.

In further embodiments, the second user computing device associated with the second vehicle occupant may also generate a spatial map of the position of the second vehicle occupant relative to the position of the first vehicle occupant. Using the generated spatial map, the second user computing device may determine that the likelihood of the second vehicle occupant being the driver is low. The second user computing device may generate a confidence factor associated with this determination. At the end of the trip, the second user computing device may transmit the spatial map and a notification to the DI server stating, "I am 85% certain that I was the passenger during this trip."

The user computing devices described herein are configured to automatically transmit and receive non-audible sonic pings (e.g., ping signals) with each other over the duration of the trip. The user computing devices are configured to establish a P2P network connection with one another to detect one another and coordinate the ping exchange process. Each user computing device having the DI application executed thereon is configured to generate a spatial map for a given trip based upon the exchanged non-audible sonic pings. In particular, the spatial map generated by each user computing device maps an approximate position of one user computing device relative to another user computing device within the vehicle.

Based upon the generated spatial map, each user computing devices may further determine which vehicle occupant is the driver based upon, for example, the country in which the vehicle occupants are currently in. For example, if the vehicle occupants are detected as being in the United States, the generated spatial map will be interpreted such that the front left side of the vehicle is the driver's seat. In this example, both the first and second user computing devices may determine that the vehicle occupant associated with a user computing device either in or closest to the driver's seat is the driver for the trip. In another example, if the vehicle occupants are detected as being in the United Kingdom, the generated spatial map will be interpreted such that the front right side of the vehicle is the driver's seat. The user computing devices may utilize location information associated with each device (e.g., GP S, GIS, longitudinal and latitude data) to confirm the location of vehicle occupants and/or vehicle for purposes of determining the driver's seat.

Additionally or alternatively, the user computing devices may be equipped with an accelerometer and/or a gyroscope. The accelerometer may be capable of measuring a linear and/or angular acceleration of a corresponding user computing device at a given moment in time. The gyroscope may be capable of determining an orientation of the corresponding user computing device. Thus, in further embodiments, the user computing device may be configured to utilize accelerometer data and/or gyroscope data to generate a spatial map that reflects more accurate information as it becomes available. For example, based upon accelerometer data and/or gyroscope data, the first user computing device may detect that the second user computing device is positioned directly behind of, directly in front of, diagonal from, to the right of, or to the left of the first user computing device in the vehicle.

In further embodiments, user computing devices may exchange results with each other via the established local P2P network. For example, user computing devices may exchange generated spatial maps with one another via the P2P network. User computing devices may also exchange information, such as the vehicle position for a respective vehicle occupant. For example, a first user computing device associated with a first vehicle occupant may share with the other devices, via the P2P network, that it has determined the first vehicle occupant to be the vehicle driver for a given trip. In this example, a second user computing device associated with a second vehicle occupant may share, via the P2P network, with the other devices that it has determined the second vehicle occupant to be a vehicle passenger for the same trip. Information exchanged among the devices via the P2P network may be utilized by each user computing device to compare results, calculate a confidence factor, and/or update a confidence factor in light of the exchanged information.

In further embodiments, the ping exchange process may be coordinated by the DI server. In these embodiments, the DI server may detect (i) a user computing device associated with a vehicle occupant within a vehicle and (ii) that the vehicle has embarked on a trip. The DI server may initiate the ping exchange process by transmitting a signal to the detected user computing device, thereby causing the user computing device to emit a non-audible sonic ping signal for detection by the other user computing device(s) within the vehicle.

In one embodiment, a user computing device may be programmed to detect the start of a trip via the DI app. The user computing device may announce the start of the trip to the DI server. In this embodiment, the DI server may retrieve an automobile insurance policy associated with the user computing device. For example, the DI server may use a user device identifier broadcast by the user computing device to identify a vehicle occupant associated with the user computing device. From the retrieved automobile insurance policy, the DI server may identify additional people registered on the same automobile insurance policy. In this embodiment, the DI server may coordinate the ping exchange process by transmitting a message to one or more user computing devices associated with the additional people identified on the same automobile insurance policy. The message may instruct the one or more user computing devices to listen for a non-audible sonic ping signal.

At least one of the technical problems addressed by this system may include: (i) inability of a GPS device to provide a geographic location measurement sufficiently precise to be used to identify the driver of a vehicle; and (ii) inability of a user computing device to automatically identify a driver and a passenger of a vehicle after a trip ends based upon non-audible sonic pings exchanged between the devices during the duration of a trip. Exemplary technical effects of the systems, methods, and computer-readable media described herein may include, for example: (i) enabling a user computing device to automatically establish a local P2P connection with another device within a vehicle for purposes of coordinating a ping exchange process to identify a vehicle driver of a trip; (ii) enabling a user computing device to identify a driver and/or a passenger of a vehicle without relying on telematics data collected from vehicle sensors and vehicle monitoring systems; (iii) enabling a vehicle driver and/or a vehicle passenger of a trip to be identified without primarily relying on GPS data; and/or (iv) enabling a user computing device to exchange ping signals and build a spatial map without depleting the user computing device's power and/or battery life by enabling the devices to establish a BLE P2P network connection with one another.

Exemplary Driver Identification System

FIG. 1 depicts an exemplary vehicle environment 100 in which a driver identification ("DI") computer system 200 (shown in FIG. 2) is utilized to identify a driver of a trip. In particular, environment I 00 illustrates utilizing DI computing system 200 to identify a vehicle driver of a trip when multiple people (e.g., users) are traveling together without requiring input from each person (e.g., prompting each person to determine whether they are a driver or a passenger of the vehicle).

As shown in FIG. 1, in the exemplary embodiment, a number of vehicle occupants, such as a first vehicle occupant 102 and a second vehicle occupant 104 embark together on a trip in a vehicle 106. Each vehicle occupant 102, 104 is associated with a corresponding user computing device 108, 110. More specifically, first user computing device 108 is associated with first vehicle occupant 102 and second user computing device 110 is associated with second vehicle occupant 104. User computing devices 108, 110 include a driver identification ("DI") application ("app") 202 (shown in FIG. 2) provided by DI server 112 that enables user computing devices 108, 110 to (i) detect when a trip has started, (ii) detect the presence of another user computing device with app 202 executed thereon within vehicle 106, (iii) transmit and receive a series of non-audible sonic pings (e.g., non-audible sonic ping signals) with at least one user computing device within vehicle 106, (iv) generate a spatial map (e.g., a relative positioning map) for a trip based upon the exchanged series of non-audible sonic pings, and (v) determine, based upon the generated spatial map, that a vehicle occupant of a plurality of vehicle occupants is the driver for a given trip.

User computing devices 108, 110 are also in communication with DI server 112 via one or more wireless communication networks 114. Network 114 may include, for example, the Internet, a Wi-Fi network, a cellular network, a satellite network, and a wireless vehicular ad-hoc network. In the exemplary embodiment, network 114 is a Wi-Fi network or a cellular network, perhaps also connected to the Internet (not separately shown in FIGS. 1 and 2), that allows user computing devices 108, 110 to communicate with DI server 112.

In the exemplary embodiment, during a trip, user computing devices 108, 110 within vehicle 106 are in communication with each other via a local peer-to-peer ("P2P") network 116 established by user computing devices 108, 110. P2P network 116 is a separate and distinct network from network 114. P2P network 116 does not require a centralized access point. Rather, in P2P network 116, devices such as user computing devices 108, 110 connect directly to each other without the need for a centralized access point. In the exemplary embodiment, user computing devices 108, 110 in vehicle 106 are programmed to establish P2P network 116 with one another over BLUETOOTH™ Low Energy (e.g., BLE), Wi-Fi, such as ad hoc Wi-Fi and Wi-Fi Direct®, and the like.

In the exemplary embodiment, each user computing device 108, 110 connected to P2P network 116 records ping data regarding the non-audible sonic pings exchanged back and forth between the specific user computing device 108, 110 and the other devices connected to P2P network 116. In the exemplary embodiment, the non-audible sonic pings exchanged between user computing devices 108, 110 are high frequency sounds in a frequency range of, for example, 1820 kHz. The non-audible sonic pings are configured to be detected by a microphone associated with each user computing device 108, 110. During a trip, a set of non-audible sonic ping signals are emitted by each user computing device 108, 110. In some embodiments, the emission of each ping signal may be spaced apart over a predetermined time interval throughout the duration of the trip.

In the exemplary embodiment, first user computing device 108 may generate a spatial map of first vehicle occupant's 102 position relative to second vehicle occupant's 104 position. Using the generated spatial map, first user computing device 108 may determine that the likelihood of first vehicle occupant 102 being the driver is substantially high. In some embodiments, first user computing device 108 may generate a confidence factor (e.g., a confidence level) associated with this determination. At the end of the trip, first user computing device 108 may transmit, to DI server 112, a trip report (not shown) that includes the generated spatial map, the determination that first vehicle occupant 102 is likely the driver, the confidence factor associated with this determination (e.g., "I am 90% certain that I was the driver of the vehicle during this trip"), and trip data. Trip data, may include ping data, GPS data, accelerometer data, gyroscope data, and additional telematics data. Trip data may also include vehicle sound data, such as a short audio clip of vehicle 106 as vehicle 106 starts up. In other embodiments where user computing device 108, 110 is in communication with a vehicle control system 204 (shown in FIG. 2) of vehicle 106, trip data may also include vehicle sensor data, such as any telematics and/or sensor data received from vehicle control system 204.

In the above example, second user computing device 110 may generate a spatial map of the second vehicle occupant's 104 position relative to the first vehicle occupant's 102 position. Using the generated spatial map, second user computing device 110 may determine that the likelihood of the second vehicle occupant 104 being the driver is low. Second user computing device 110 may generate a confidence factor associated with this determination. At the end of the trip, second user computing device 110 may transmit the spatial map and a notification to DI server 112 stating, "I am 85% certain that I was the passenger during this trip." Thus, each user computing device 108, 110 having app 202 executed thereon may be configured to generate a spatial map for the embarked trip based upon the exchanged non-audible sonic pings. Although two vehicle occupants 102, 104 and two corresponding user computing devices 108, 110 are discussed with respect to FIGS. 1 and 2, DI system 200 may include any additional number of user computing devices based upon the number of vehicle occupants in vehicle 106 for a given trip.

In the exemplary embodiment, vehicle 106 is a manually-operated vehicle that enables a human driver to operate and control vehicle 106. In some embodiments, vehicle 106 may include autonomous or semi-autonomous vehicle-related functionality or technology that may be used with the present embodiments to replace one or more human driver actions, and may include and/or be related to limited driver control functionalities. In these embodiments, the autonomous or semi-autonomous vehicle-related functionality or technology may be controlled, operated, and/or in communication with vehicle control system 204 (shown in FIG. 2).

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsiveness monitoring; pedestrian detection; artificial intelligence and/or back-up systems; navigation or GP S-related systems; security and/or anti-hacking measures; and/or theft prevention systems. While vehicle 106 may be an automobile in the exemplary embodiment, in other embodiments, vehicle 106 may be, but is not limited to, other types of ground craft, aircraft, and watercraft vehicles.

Figure 2:
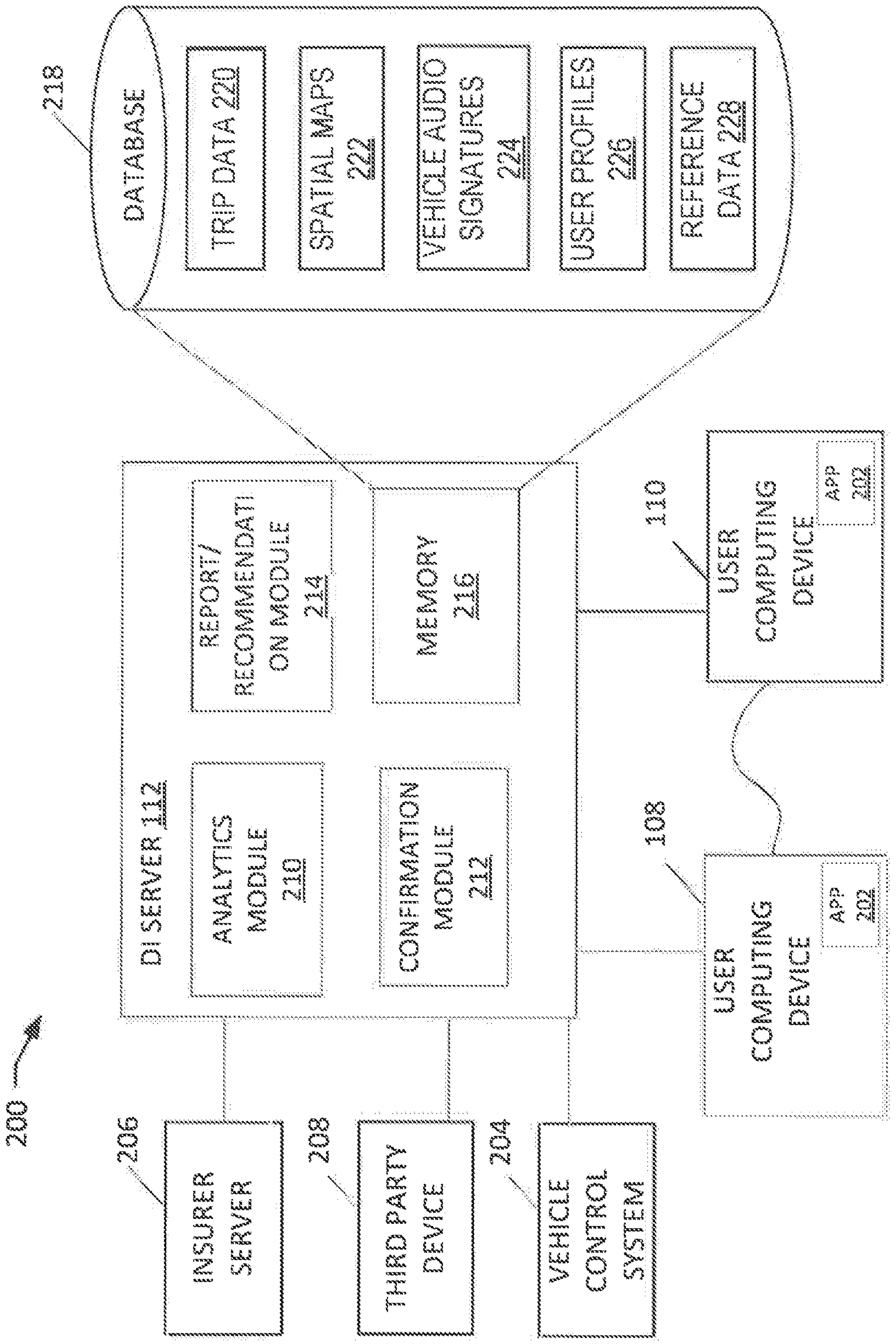
FIG. 2 illustrates a schematic diagram of an exemplary driver determination ("DI") system in accordance with one embodiment of the present disclosure.

FIG. 2 depicts a schematic diagram of an exemplary DI computer system 200. DI computer system 200 is described herein with combined reference to FIG. 1 and FIG. 2. DI computer system 200 includes a driver identification ("DI") server 112 in communication with user computing devices 108, 110 (shown in FIG. 1), an insurer server 206 of an insurer network (not shown), a third party device 208, and a vehicle control system 204 associated with a vehicle, such as vehicle 106 (shown in FIG. 1).

In the exemplary embodiment, DI server 112 may include a plurality of modules, such as an analytics module 210, a confirmation module 212, and a report/recommendation module 214. DI server 112 may further include a memory 216. Analytics module 210 may be utilized by DI server 112 to analyze and process the data in trip reports received from user computing devices 108, 110. DI server 112 may compare trip data attributed to a driver for a particular trip with historic trip data of the driver. DI server 112 may utilize analytics module 210 to detect any patterns and/or changes in driver behavior. Confirmation module 212 may be utilized by DI server 112 to confirm that the vehicle occupant identified by user computing device 108, 110 is the driver of a given trip. In events where user computing device 108, 110 is unsure as to which vehicle occupant is the driver, and/or in events where the confidence level associated with a driver identification is low, DI server 112 may utilize confirmation module 212 to confirm the driver of the trip.

In some embodiments, DI server 112 may utilize confirmation module 212 to reach out to the detected vehicle occupants for confirmation (e.g., "Can you please confirm that you were the driver of a 2017 Toyota Tacoma during the recent trip taken on Aug. 8, 2019?"). Report/recommendation module 214 may be utilized by DI server 112 to generate reports and recommendations based upon analyzed data received from user computing device 108, 110. In one embodiment, for a particular user, DI server 112 may detect shifts in driving pattern and/or driving behavior (e.g., driving a different route in the mornings, driving more frequently, driving less frequently, driving longer distances) over a period of time. Based upon these detected changes, DI server 112 may generate reports and/or recommendations for the user and/or an automobile insurance provider associated with the user. For example, DI server 112 may generate a report summarizing the driving trends associated with a particular user for a specific period of time, and may provide the generated report to insurer server 206.

DI server 112 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Memory 216 may include one or more database(s) 218. Additionally or alternatively, memory 216 may include a database server (not shown). In an alternative embodiment, database 218 may be stored remotely from DI server 112 and may be non-centralized. Database 218 may include such information as, for example, trip data 220. As described above, with reference to FIG. 1, trip data 220 may include ping data, GPS data, accelerometer data, gyroscope data, additional telematics data, and vehicle sound data, including a short audio clip of vehicle 106 as vehicle 106 starts up. In embodiments where user computing device 108, 110 is in communication with vehicle control system 204 of vehicle 106, trip data 220 may also include vehicle sensor data received from vehicle control system 204. Database 218 may also include spatial maps (e.g., relative positioning maps) 222 received from user computing devices 108, 110 for each trip. Database 218 may also include vehicle audio signatures 224 to identify the vehicle for which trip data 220 and spatial maps 222 are associated with. Database 218 may further include user profiles 226 associated with vehicle occupants (e.g., users) registered with DI server 112. For example, vehicle occupants may register with DI server 112 at the time of downloading app 202 on their respective user computing devices 108, 110.

DI server 112 may compare an audio clip of vehicle 106 received from user computing device 108, 110 to vehicle audio signatures 224 to identify the make and/or model of vehicle 106. For example, DI server 112 may identify vehicle 106 as a 2016 Chevy Tahoe. In further embodiments, DI server 112 may use a device identifier (e.g., device serial number, IMEI/MEID number) associated with user computing device 108, 110 in addition to the detected vehicle make and/or model to identify a user profile associated with user computing device 108, 110. In these embodiments, DI server 112 may update the respective user profiles with the information received from each user computing device 108, 110. Device identifiers may be provided to DI server 112 in, for example, a trip report from user computing device 108, 110 at the end of a trip. In some embodiments, once DI server 112 has identified a vehicle occupant as the driver of a trip, DI server 112 may link the received trip data 220 (including telematics data) with the driver's user profile.

This information may be transmitted to insurer server 206 for insurance purposes. For example, trip data 220 associated with the identified driver may be provided to insurer server 206 in order to associate driving scores with the correct user. Further, updated user profiles 226 may be provided to insurer server 206 to enable discounts to be provided for safe driving, to review and/or adjust automobile insurance policies for policyholder users, and/or to lower a user's automobile insurance premium. In further embodiments, DI server 112 may provide information from user profiles 226 to third party devices 208 associated with third parties, including, for example, automobile manufacturers.

In the exemplary embodiment, database 218 further includes reference data 228. Reference data 228 includes parameters associated with each set of ping signals transmitted by user computing devices 108, 110. Reference data 228 provides the time intervals between each ping signal to be transmitted as well as the number of ping signals to be transmitted in each set. Reference data 228 may be periodically updated by DI server 112. DI server 112 may also transmit instructions with updated reference data 228 to user computing devices 108, 110 via app 202 to update the timing sequence of each set of ping signals. In one exemplary embodiment, database 218 may include a cloud storage device, such that information stored thereon may be accessed by one or more components of DI system 200, such as, for example, user computing devices 108, 110, insurer server 206, third party device 208, and/or vehicle control system 204. In an alternative embodiment, database 218 may be stored remotely from DI server 112 and may be non-centralized.

Figure 3:
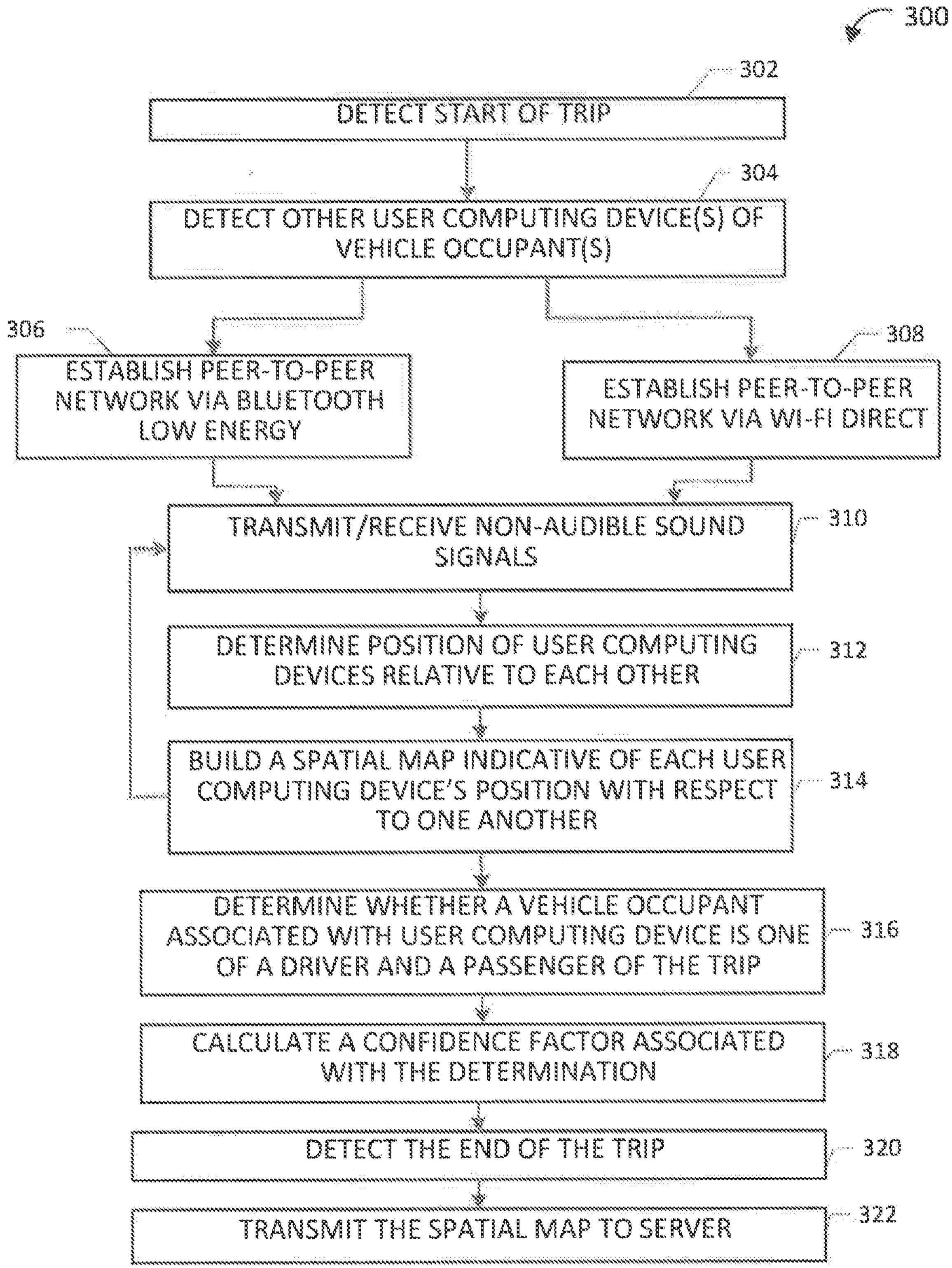
FIG. 3 illustrates a flow chart of an exemplary process for identifying a driver of a vehicle using the DI system illustrated in FIG. 2.

Exemplary Process for Identifying a Vehicle Driver When Multiple People are Traveling Together in a Vehicle FIG. 3 illustrates a flow chart of an exemplary process 300 for determining a driver of a vehicle (e.g., vehicle 106, shown in FIG. 1) during a trip using DI system 200 (shown in FIG. 2). In particular, process 300 is executed by a user computing device registered with DI server 112, such as user computing devices 108, 110 (all shown in FIG. 1). In the exemplary embodiment, the relative positions of user computing devices in a vehicle are determined by utilizing the sensors in each user computing device rather than by relying on external sensors such as, for example, sensors within or part of the vehicle.

Process 300 may include detecting 302 that a trip has started. In the exemplary embodiment, user computing devices are configured to record telematics data for a trip via app 202. The user computing devices are also configured to determine, from the recorded telematics data, that a trip has started. For example, a vehicle occupant's user computing device may detect that a trip has started by detecting the device's movement. The user computing device may include sensors, such as an accelerometer and/or a gyroscope configured to detect movement. In other embodiments, the user computing device may be configured to utilize GPS data to detect that a trip has started. Process 300 also includes detecting 304 other user computing devices within the vehicle. In the exemplary embodiment, in addition to detecting the start of a trip, a user computing device of a first vehicle occupant is configured to scan for and detect user computing devices of other occupants within the vehicle. In particular, each user computing device having app 202 is configured to scan for and detect other user computing devices within the vehicle that are executing app 202.

Once a user computing device detects another user computing device within the vehicle, process 300 includes establishing a peer-to-peer ("P2P") network (e.g., P2P network 116, shown in FIG. 1). In the exemplary embodiment, user computing devices within the vehicle attempt to establish 306 a P2P network via BLUETOOTH™ Low Energy (e.g., BLE). For example, a first vehicle occupant's user computing device may detect the BLE messaging capabilities of a second vehicle occupant's user computing device within the vehicle. However, in events where attempts to establish a BLE P2P network are unsuccessful, user computing devices are configured to establish 308 a P2P network using Wi-Fi, such as ad hoc Wi-Fi, Wi-Fi Direct®, and the like. In certain embodiments, user computing devices may be configured to establish a Wi-Fi P2P network instead of a BLE P2P network. In the exemplary embodiment, a local P2P network is established to enable user computing devices within a vehicle to exchange a series of pings throughout the trip, thereby enabling the user computing devices to generate spatial maps. Each user computing device is configured to generate a spatial map that depicts the positions of the devices connected to the P2P network in the vehicle. Thus, the established P2P network is utilized to coordinate the ping signal exchange process between the connected devices.

Process 300 may also include initiating the ping signal exchange process over the established P2P network. User computing devices connected to the P2P network transmit and receive 310 non-audible sonic pings throughout the trip. In some embodiments, the ping signal exchange process is coordinated between the devices connected to the P2P network without any communication to DI server 112. A user computing device attempts to establish a P2P network and subsequently initiate the ping signal exchange process when the user computing device detects that (i) a trip has started and (ii) another user computing device having app 202 thereon is nearby. When a P2P network is established between or among user computing devices, each user computing device may transmit a message to the other devices within the vehicle. The message may provide information including, for example, a device identifier and/or a unique identifier associated with the user computing device, and a request asking the other user computing device to initiate the ping signal exchange process (e.g., "Please send the first ping signal. I will listen for it."). In other embodiments, after directly connecting with each other via the P2P network, the user computing devices may automatically begin transmitting ping signals to one another.

The ping signals exchanged among the user computing devices are high frequency sounds that can be detected by a user computing device's microphone, but are inaudible to humans (e.g., humans can hear up to 20 kiloHertz ("KHz")). In the exemplary embodiment, a user computing device is configured to transmit a set of signals over the duration of the trip. The user computing devices may be configured to transmit ping signals at a set increment of time. For example, a user computing device may be configured to transmit a ping signal every thirty seconds or every minute.

In certain embodiments, the ping signal exchange process is coordinated through DI server 112 rather than through a P2P network via BLE or Wi-Fi. DI server 112 may coordinate the ping signal exchange process when two or more policyholders of the same policy embark on a trip together in the vehicle. For example, a husband and wife, siblings, or parent and dependent of the same automobile insurance policy may take a trip together in one vehicle. In this embodiment, user computing devices associated with policyholders on the same policy each have app 202 executed thereon. Each user computing device is configured to detect and announce the start of a trip to DI server 112. In response, DI server 112 may announce that the ping signal exchange process is starting, and subsequently instruct each user computing device of the policy to listen for a non-audible sonic ping signal.

Process 300 may also include determining 312 the position of each user computing device connected to the P2P network relative to one another. During the ping signal exchange process, each user computing device records the timing associated with each ping signal broadcast from and detected by a user computing device. Each user computing device within the vehicle may be programmed to utilize the recorded timing data associated with the ping signals to calculate and track the time delay measurement between two ping signals. In particular, user computing devices may track the time delay measurement between two ping signals transmitted from a particular user computing device and the time delay measurement between two pings received by a user computing device. A user computing device may also be programmed to take into account changes in movements and positions of the user computing device. For example, the user computing devices may be configured to detect characteristics of the transmission of sound with respect to the exchanged ping signals and use the Doppler effect to detect movement associated with a user computing device (e.g., user computing device being picked up by a vehicle occupant, user computing device being moved to a different area in the vehicle). User computing devices may further utilize the series of ping signal exchanged among one another to determine where each user computing device is positioned within the vehicle.

Process 300 may also include building 314 a spatial map indicative of the positions of the user computing devices within the vehicle. During the trip, each user computing device may build up a spatial map of the device positions relative to one another based upon the emitted and detected ping signals. User computing devices may continually update their respective spatial maps with each ping signal exchanged during the trip. In some embodiments, user computing devices may gather ping data for the duration of the trip, and subsequently generate a spatial map at the end of the trip based upon the gathered ping data. Ping data may be analyzed to determine an approximation of the distance between each user computing device in the vehicle. Process 300 also includes determining 316 by a user computing device whether a vehicle occupant associated with the device is a driver or a passenger of the trip. User computing devices are programmed to make the determination based upon each device's respective spatial map. Process 300 may also include calculating 318 a confidence factor (e.g., a confidence level) associated with the determination. The confidence factor may be based upon ping data, such as, for example, the strength of the detected ping signals and the number of ping signals emitted and detected throughout the trip.

Process 300 may also include detecting 320, by each user computing device, that a trip has ended. A user computing device may detect via app 202 that a trip has ended based upon recorded telematics data for the trip. The user computing device may detect based upon, for example, location data, accelerometer data, and/or gyroscope data, that movement of the user computing device has stopped for an extended period of time, and thus the trip has ended. Process 300 may further include transmitting 322, by the user computing device, the generated spatial map to DI server 112 via app 202. A user computing device may transmit the generated spatial map as part of a trip report transmitted to DI server 112. In addition to the spatial map, the transmitted trip report may also include an indication as to whether the vehicle occupant associated with the user computing device is the driver or a passenger of the vehicle, a confidence factor associated with the indication, and trip data. Trip data may include ping data, GPS data, accelerometer data, gyroscope data, additional telematics data, and the like.

Exemplary User Computing Device

Figure 4:
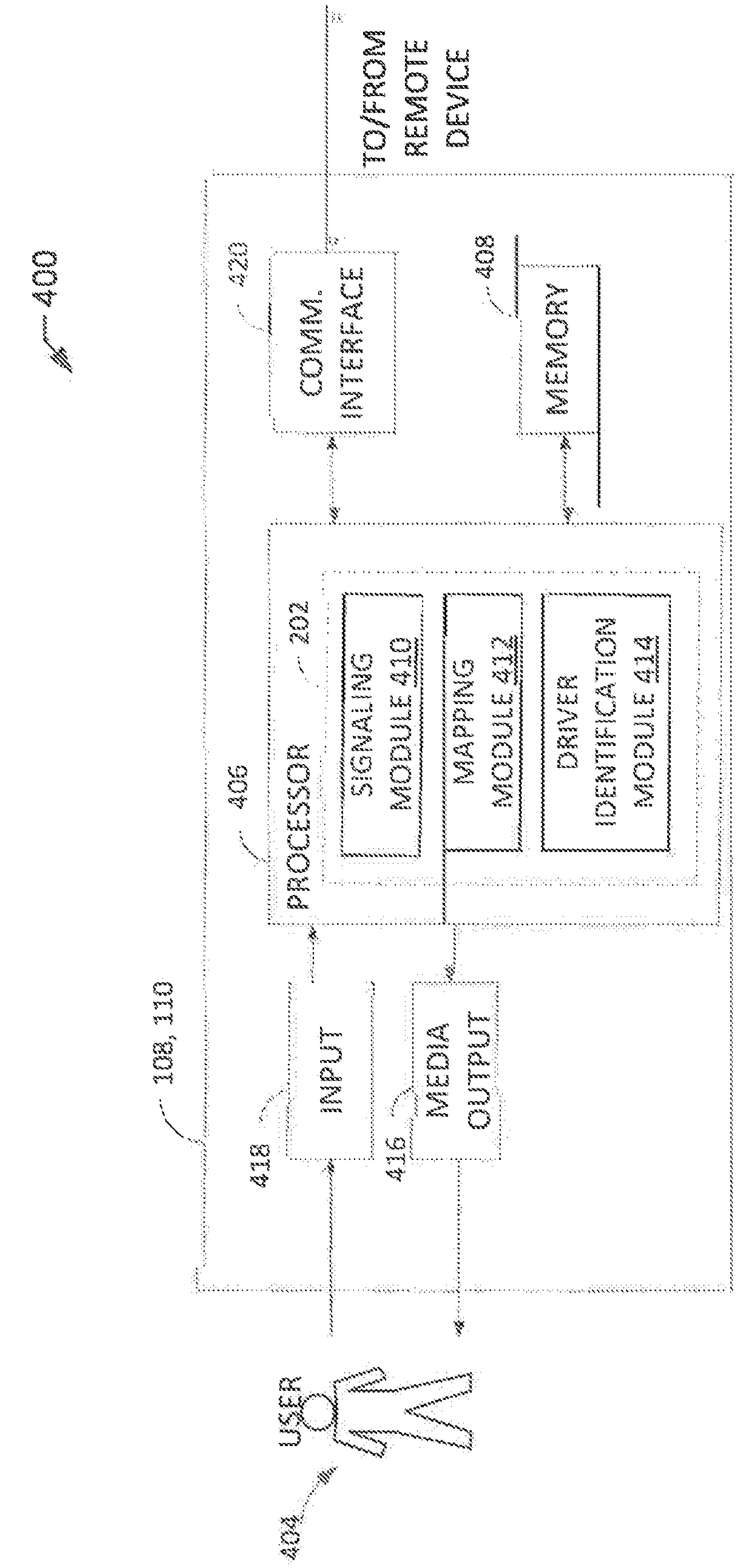
FIG. 4 illustrates an exemplary configuration of a user computing device that may be used with the DI system illustrated in FIG. 2.

FIG. 4 illustrates an exemplary environment 400 of user computing device 108, 110 (shown in FIG. 1) operated by a user 404 in accordance with one embodiment of the present disclosure. User 404 is a vehicle occupant registered with DI server 112 (shown in FIG. 1). For example, user 404 may be first vehicle occupant 102 associated with first user computing device 108. In another example, user 404 may be second vehicle occupant 104 associated with second user computing device 110. In the exemplary embodiment, user computing device 108, 110 interacts with other user computing devices within vehicle 106.

User computing device 108, 110 may include a processor 406 for executing instructions. In some embodiments, executable instructions may be stored in a memory area 408. Processor 406 may include one or more processing units (e.g., in a multi-core configuration). In the exemplary embodiment, processor 406 is operable to execute app 202 (shown in FIG. 1). App 202 includes a signaling module 410, a mapping module 412, and a driver identification module 414. Modules 410, 412, and 414 may include specialized instruction sets, functions, and/or sub-modules or any combination thereof needed to execute the functionality described herein. Signaling module 410 may be configured to emit non-audible sonic ping signals throughout a given trip. Signaling module 410 may also be configured to track ping data associated with ping signals exchanged with other user computing devices within vehicle 106 during a trip.

Mapping module 412 may be configured to build a spatial map of the positions of the user computing devices in vehicle 106 relative to one another. Mapping module 412 may be configured to analyze ping data to determine factors, such as an estimated distance between two user computing devices in vehicle 106. Driver identification module 414 may be configured to determine whether a vehicle occupant associated with user computing device 108, 110 is a driver or a passenger of vehicle 106 for a given trip. Driver identification module 414 may utilize the generated spatial map to determine a likelihood of an associated vehicle occupant being a driver or a passenger of vehicle 106.

In the exemplary embodiment, user computing device 108, 110 may also include at least one media output component 416 for presenting information to user 404. Media output component 416 may be any component capable of conveying information to user 404. In some embodiments, media output component 416 may include an output adapter such as a video adapter and/or an audio adapter. An output adapter may be operatively coupled to processor 406 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

User computing device 108, 110 may also include an input device 418 for receiving input from user 404. Input device 418 includes a microphone for detecting non-audible sonic ping signals from surrounding user computing devices within vehicle 106 for a given trip. Input device 418 may also include, for example, a keyboard, a pointing device, a mouse, a stylus, a touch sensitive panel (e.g., a touch pad or a touch screen), a gyroscope, an accelerometer, a position detector, or an audio input device. For example, a single component such as a touch screen may function as both an output device of media output component 416 and input device 418.

User computing device 108, 110 may also include a communication interface 420, which can be communicatively coupled to a remote device, such as DI server 112 (shown in FIG. 1). Communication interface 420 may include, for example, a wired or wireless network adapter or a wireless data transceiver for use with a peer-to-peer ("P2P") network (e.g., P2P network 116, as shown in FIG. 1) over BLUETOOTH™ Low Energy (e.g., BLE), Wi-Fi, such as ad hoc Wi-Fi and Wi-Fi Direct®, and the like. Communication interface 420 may also include a wired or wireless network adapter or a wireless data transceiver for use with a mobile phone network (e.g., Global System for Mobile Communications (GSM), 3G, 4G or BLUETOOTH™) or other mobile data network (e.g., Worldwide Interoperability for Microwave Access (WIMAX)).

Stored in memory area 408 may be, for example, computer readable instructions for providing a user interface to user 404 via media output component 416 and, optionally, receiving and processing input from input device 418. A user interface may include, among other possibilities, a web browser and/or an interface for client application, such as app 202. Web browsers may enable users, such as user 404, to display and interact with media and other information typically embedded on a web page or a website. App 202 may allow user 404, such as first vehicle occupant 102 or second vehicle occupant 104 (both shown in FIG. 1), to interact with DI server 112.

Exemplary Driver Identification Server

Figure 5:
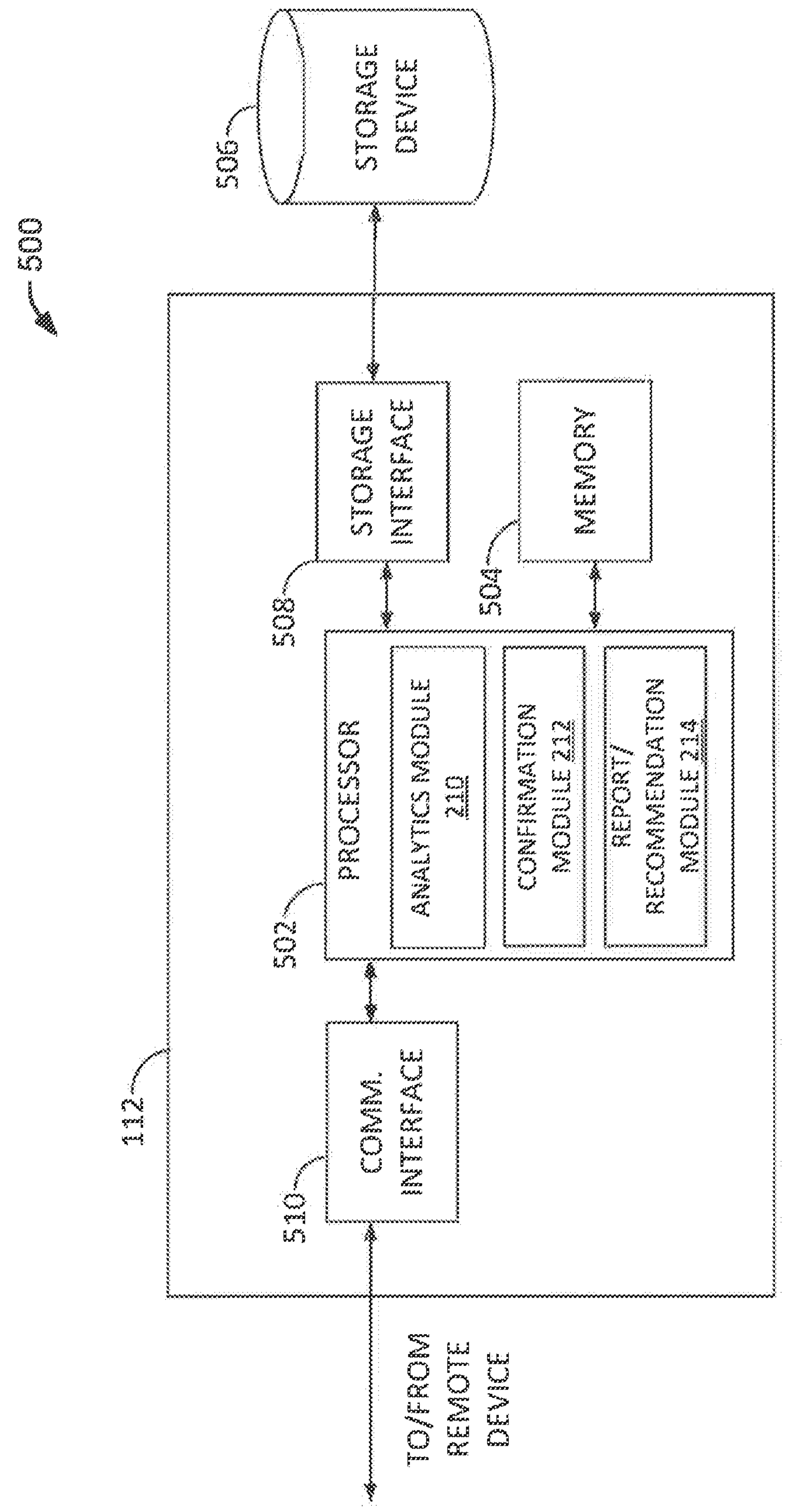
FIG. 5 illustrates an exemplary configuration of a driver determination ("DI") server of the DI system illustrated in FIG. 2.

FIG. 5 depicts an exemplary configuration 500 of DI server 112 (shown in FIG. 1) in accordance with one embodiment of the present disclosure. DI server 112 includes a processor 502 for executing instructions. Instructions are stored in a memory area 504, for example. Memory area 504 may be similar to or the same as memory 216 (shown in FIG. 2). Processor 502 includes one or more processing units (e.g., in a multi-core configuration).

In the exemplary embodiment, processor 502 is operable to execute analytics module 210, confirmation module 212, and report/recommendation module 214. Modules 210, 212, and 214 may include specialized instruction sets, and/or coprocessors. With reference to FIG. 2, analytics module 210 may be utilized by DI server 112 to analyze and process the data in trip reports received from user computing devices 108, 110. DI server 112 may utilize analytics module 210 to detect any patterns and/or changes in driver behavior. Confirmation module 212 may be utilized by DI server 112 to confirm that the vehicle occupant associated with a user computing device (e.g., user computing device 108, 110, shown in FIG. 1) is correctly identified as the driver or passenger of vehicle 106 for a given trip. For example, confirmation module 212 may be utilized to transmit a message to a vehicle occupant, asking the vehicle occupant to confirm their status as driver or passenger. Report/recommendation module 214 may be utilized by DI server 112 to generate reports and recommendations based upon analyzed data received from user computing device 108, 110. Report/recommendation module 214 may also be utilized to generate reports and/or recommendations based upon spatial maps generated by user computing device 108, 110. For example, DI server 112 may generate a report summarizing the driving trends associated with a particular user for a specific period of time.

In the exemplary embodiment, processor 502 is operatively coupled to a communication interface 510 such that DI server 112 is capable of communicating with remote device(s) such as user computing devices 108, 110, insurer server 206, third party device 208, and vehicle control system 204 of vehicle 106 (all shown in FIG. 2) (for example, using wireless communication or data transmission over one or more radio links or digital communication channels). For example, communication interface 510 may receive trip reports including spatial maps, ping data, and/or trip data from user computing devices 108, 110 after each trip. In another example, communication interface 510 may receive requests for statistics and/or driver trend reports from computer devices associated with, for example, insurer server 206 and/or vehicle manufacturers via the Internet or other network.

In further embodiments, processor 502 may be programmed to coordinate a ping exchange process. Processor 502 may be programmed to detect (i) when vehicle 106 embarks on a trip and (ii) one or more user computing devices within vehicle 106. In some embodiments, one or more user computing devices within vehicle 106 may announce to DI server 112 that a trip has begun. Processor 502 may instruct one of the user computing devices to emit a non-audible sonic ping signal and instruct the other user computing devices within vehicle 106 to listen for the emitted signal.

Processor 502 may also be operatively coupled to a storage device 506. Storage device 506 may be database 218 (shown in FIG. 2). Storage device may be any computer-operated hardware suitable for storing and/or retrieving data. In some embodiments, storage device 506 may be integrated in DI server 112. For example, DI server 112 may include one or more hard disk drives as storage device 506.

In other embodiments, storage device 506 is external to DI server 112 and is accessed by a plurality of computer devices. For example, storage device 506 may include a storage area network (SAN), a network attached storage (NAS) system, and/or multiple storage units such as hard disks and/or solid state disks in a redundant array of inexpensive disks (RAID) configuration, cloud storage devices, and/or any other suitable storage device.

In some embodiments, processor 502 may be operatively coupled to storage device 506 via a storage interface 508. Storage interface 508 may be any component capable of providing processor 502 with access to storage device 506. Storage interface 508 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 506.

Processor 502 may execute computer-executable instructions for implementing aspects of the disclosure. In some embodiments, processor 502 may be transformed into a special purpose microprocessor by executing computer-executable instructions or by otherwise being programmed. For example, processor 502 may be programmed with the instruction such as those illustrated in FIG. 3 and FIG. 6.

Memory areas 504 and 408 (shown in FIG. 4) may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Exemplary Computer-Implemented Method for Identifying a Driver of a Trip

Figure 6:
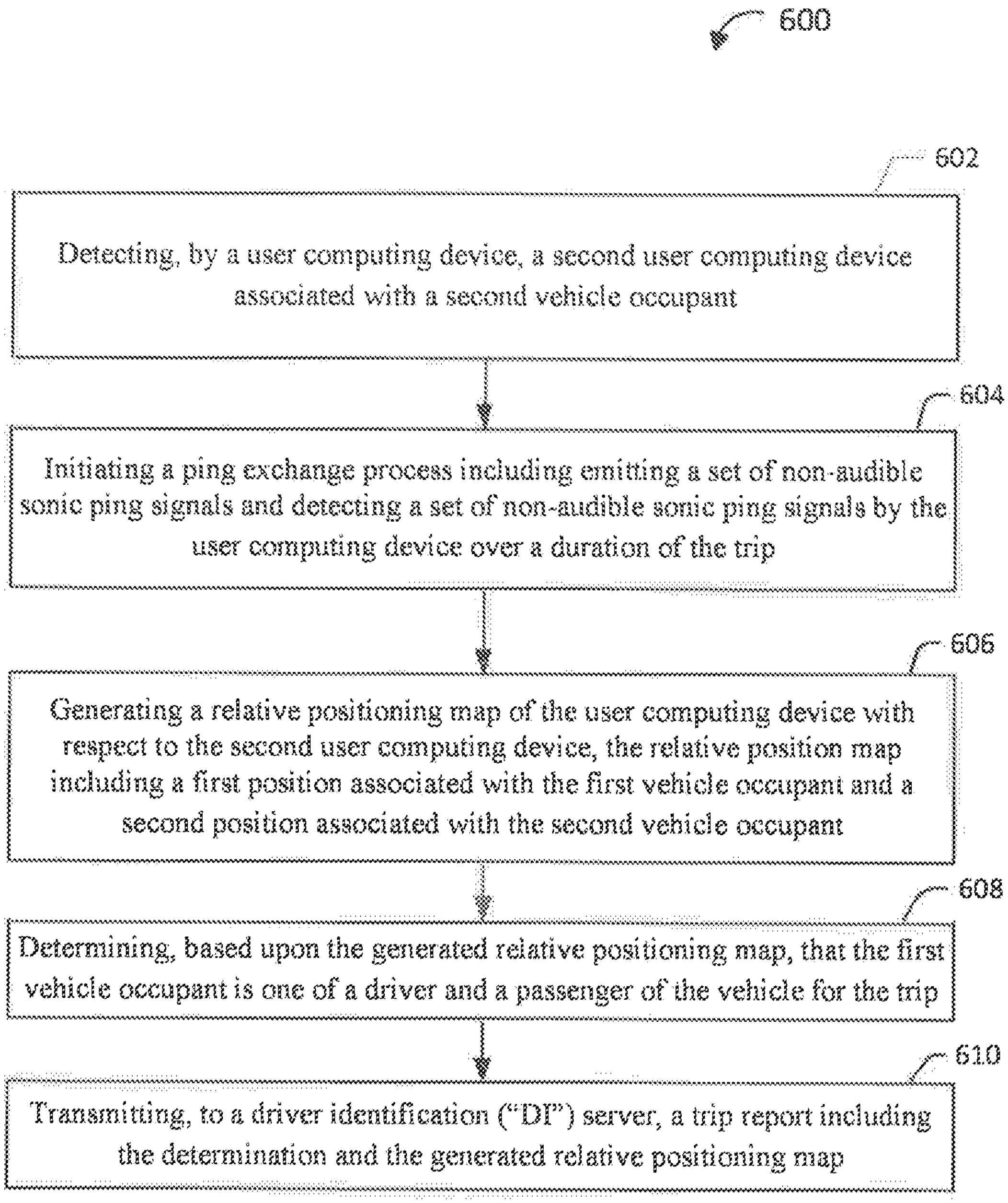
FIG. 6 illustrates a flow chart of another exemplary computer-implemented process implemented by the DI system illustrated in FIG. 2.

FIG. 6 illustrates a flow chart of another exemplary computer-implemented process 600 for identifying a driver of a vehicle (e.g., vehicle 106, shown in FIG. 1) using DI computer system 200 (shown in FIG. 2). In the exemplary embodiment, process 600 is performed by a user computing device (e.g., first user computing device 108, shown in FIG. 1) in communication with DI server 112 (shown in FIG. 1). The user computing device includes a driver identification ("DP") telematics application (e.g., app 202, shown in FIG. 2) provided by DI server 112 executed thereon.

Process 600 may include detecting 602 a second user computing device (e.g., second user computing device 110, shown in FIG. 1) associated with a second vehicle occupant. The telematics application provided by DI server may be executed on the second user computing device. Process 600 may also include initiating 604 a ping exchange process including emitting a set of non-audible sonic ping signals and detecting a set of non-audible sonic ping signals from the second user computing device over a duration of the trip. Process 600 may further include generating 606, by the user computing device, a relative positioning map (e.g., a spatial map). The relative positioning map depicts positions of the user computing device with respect to the second user computing device within the vehicle. The relative positioning map may include a first position associated with the first vehicle occupant and a second position associated with the second vehicle occupant. Process 600 may also include determining 608, by the user computing device, based upon the generated relative positioning map, that the first vehicle occupant is one of a driver and a passenger of the vehicle for the trip. Process 600 may also include transmitting 610, by the user computing device, to DI server 112, a trip report including the determination and the generated relative positioning map.

More Embodiments of Identifying a Driver

Many indoor positioning systems rely on a group of pre-deployed access points to determine the location of a device. These strategies are not useful in a vehicle where there is no opportunity to install access points at known locations. According to some embodiments, a DI system is configured to determine relative locations of one or more devices without the need for pre-deployed access points, which is referred to as relative position and orientation (RPO). In some embodiments, an RPO system is configured to use radio waves or sound waves to establish the relative locations of multiple devices within a confined space for example, the interior of a vehicle.

According to certain embodiments, the DI system (e.g., the DI computer system 200 in FIG. 2) includes a first user device (e.g., computing device 108 in FIG. 1 and FIG. 2) associated with a first vehicle occupant of a vehicle and a second user device (e.g., computing device 110 in FIG. 1 and FIG. 2) associated with a second vehicle occupant of the vehicle during a vehicle trip. In some embodiments, the first user device includes one or more processors and one or more memories. In certain embodiments, the DI system and/or the first user device is configured to collect an audio clip of the vehicle during the vehicle trip. In some examples, the audio clip is collected proximate to the start of the vehicle trip. In certain examples, the audio clip is collected within five (5) minutes from the start of the vehicle trip. In some examples, the audio clip is collected within one (1) minute from the start of the vehicle trip. In certain examples, the audio clip is collected within thirty (30) seconds from the start of the vehicle trip.

According to some embodiments, the DI system and/or the first user device is configured to compare the audio clip of the vehicle to one or more vehicle audio signatures to identify a type of the vehicle. In certain embodiments, a type of the vehicle refers to a model, a make, a year, and/or other parameters of the vehicle. In some embodiments, the one or more vehicle audio signatures are stored in a data repository (e.g., memory 216 in FIG. 2, database 218 in FIG. 2). In certain embodiments, the one or more vehicle audio signatures are obtained from software interfaces (e.g., application programming interfaces (APIs), web services). In some embodiments, the DI system and/or the first user device is configured to obtain (e.g., retrieve, receive) a spatial map of the vehicle based upon the type of the vehicle. In certain embodiments, the spatial map is a three-dimensional map of an interior of the vehicle. In some embodiments, the spatial map is a two-dimensional map of an interior of the vehicle. In certain examples, the spatial map includes the locations of the windows, boards, chairs, and other objects in the vehicle.

According to certain embodiments, the DI system and/or the first user device is configured to initiate a ping exchange process by emitting a first set of non-audible ping signals. In some embodiments, the DI system and/or the first user device is configured to detect a second set of non-audible ping signals from a second user device associated with a second vehicle occupant of the vehicle over a duration of the vehicle trip. In certain embodiments, the DI system and/or the first user device is configured to generate a first relative positioning map based upon the spatial map and the second set of non-audible ping signals, where the first relative position map includes a first position associated with the first vehicle occupant and a second position associated with the second vehicle occupant. In some embodiments, the DI system and/or the first user device is configured to determine that the first vehicle occupant is a driver or a passenger of the vehicle for the vehicle trip based at least in part upon the first relative positioning map.

According to some embodiments, the DI system and/or the first user device is configured to use a wireless network (e.g., Bluetooth, Ultra Wide Band (UWB)) to detect the existence of the second user device. According to some embodiments, the DI system and/or the first user device is configured to use a low energy wireless network to detect the existence of the second user device. In certain embodiments, the first user device is configured to establish a local peer-to-peer network connection with the second user device to coordinate the ping exchange process. In some embodiments, exchange of relative signal strength or echolocation spatial mapping data can be done between devices via the peer-to-peer network established within the vehicle.

According to certain embodiments, the first user device is configured to receive a first ping signal emitted by the second user device using a radio sensor (e.g., a microphone) or a sensor array (e.g., an antenna array) associated with the first user device. In some embodiments, the first user device is configured to measure and/or determine one or more signal parameters of the first ping signal. In certain embodiments, the one or more signal parameters include, for example, a time of arrival (TOA), an angle of arrival (AOA), received signal strength (RS S), a time difference of arrival (TDOA), and/or the like. In some embodiments, the first user device is configured to record a first time of arrival of the first ping signal. In certain embodiments, the first user device is configured to determine a first angle of arrival of the first ping signal. In some embodiments, the first user device is configured to determine a first received signal strength of the first ping signal. In certain embodiments, the first user device is configured to determine a first time difference of arrival of the first ping signal for an emission time of the first ping signal. In certain embodiments, the first user device is configured to transmit the one or more signal parameters of the first ping signal to the second user device. In some embodiments, the first user device is configured to transmit the one or more signal parameters of the first ping signal to the second user device via the peer-to-peer network.

According to some embodiments, the first user device is configured to emit a second ping signal for detection by the second user device in response to detecting and/or receiving the first ping signal. In certain embodiments, the second user device is configured to receive the second ping signal using a radio sensor (e.g., a microphone) or a sensor array (e.g., an antenna array) associated with the first user device. In some embodiments, the second user device is configured to measure and/or determine one or more signal parameters of the second ping signal. In certain embodiments, the one or more signal parameters include, for example, a time of arrival (TOA), an angle of arrival (AOA), received signal strength (RS S), a time difference of arrival (TDOA), and/or the like. In some embodiments, the second user device is configured to record a second time of arrival of the second ping signal. In certain embodiments, the second user device is configured to determine a second angle of arrival of the second ping signal. In some embodiments, the second user device is configured to determine a second received signal strength of the second ping signal. In certain embodiments, the second user device is configured to determine a second time difference of arrival of the second ping signal for an emission time of the second ping signal. In certain embodiments, the second user device is configured to transmit the one or more signal parameters of the second ping signal to first second user device. In some embodiments, the second user device is configured to transmit the one or more signal parameters of the second ping signal to the first user device via the peer-to-peer network.

According to certain embodiments, the DI system and/or the first user device is configured to generate the first relative positioning map based upon the one or more signal parameters of the first ping signal and/or the one or more signal parameters of the second ping signal. In some embodiments, the DI system and/or the first user device is configured to generate the first relative positioning map based upon the spatial map of the vehicle, the one or more signal parameters of the first ping signal and/or the one or more signal parameters of the second ping signal. In certain embodiments, the DI system and/or the first user device is configured to determine a time difference between the first time of arrival and the second time of arrival. In some embodiments, the DI system and/or the first user device is configured to generate the first relative positioning map based upon the time difference between the first time of arrival and the second time of arrival. In certain embodiments, the DI system and/or the first user device is configured to generate the first relative positioning map based upon the time difference between the first time of arrival and the second time of arrival and the spatial map of the vehicle.

In some embodiments, the DI system and/or the first user device is configured to generate the first relative positioning map based upon the first angle of arrival of the first ping signal. In certain embodiments, the DI system and/or the first user device is configured to generate the first relative positioning map based upon the first angle of arrival of the first ping signal and the second angle of arrival of the first ping signal. In some embodiments, the DI system and/or the first user device is configured to generate the first relative positioning map based upon the first angle of arrival of the first ping signal and the spatial map of the vehicle. In certain embodiments, the DI system and/or the first user device is configured to generate the first relative positioning map based upon the first angle of arrival of the first ping signal, the second angle of arrival of the first ping signal, and the spatial map of the vehicle.

According to some embodiments, the DI system and/or the first user device is configured to generate the first relative positioning map based upon the first received signal strength of the first ping signal. In certain embodiments, the DI system and/or the first user device is configured to generate the first relative positioning map based upon the first received signal strength of the first ping signal and the spatial map of the vehicle. In some embodiments, the DI system and/or the first user device is configured to generate the first relative positioning map based upon the first received signal strength of the first ping signal and the second received signal strength of the second ping signal. In certain embodiments, the DI system and/or the first user device is configured to generate the first relative positioning map based upon the first received signal strength of the first ping signal, the second received signal strength of the second ping signal and the spatial map of the vehicle.

According to certain embodiments, the DI system and/or the first user device is configured to generate the first relative positioning map based upon the first time of arrival of the first ping signal. In some embodiments, the DI system and/or the first user device is configured to generate the first relative positioning map based upon the first time of arrival of the first ping signal and the spatial map of the vehicle. In certain embodiments, the DI system and/or the first user device is configured to generate the first relative positioning map based upon the first time of arrival of the first ping signal and the second time of arrival of the second ping signal. In some embodiments, the DI system and/or the first user device is configured to generate the first relative positioning map based upon the first time of arrival of the first ping signal, the second time of arrival of the second ping signal and the spatial map of the vehicle.

According to some embodiments, the DI system and/or the first user device is configured to generate the first relative positioning map based upon the first time of arrival of the first ping signal. In some embodiments, the DI system and/or the first user device is configured to generate the first relative positioning map based upon the first time of arrival of the first ping signal and the spatial map of the vehicle. In certain embodiments, the DI system and/or the first user device is configured to generate the first relative positioning map based upon the first time of arrival of the first ping signal and the second time of arrival of the second ping signal. In some embodiments, the DI system and/or the first user device is configured to generate the first relative positioning map based upon the first time of arrival of the first ping signal, the second time of arrival of the second ping signal and the spatial map of the vehicle.

According to certain embodiments, the DI system and/or the first user device is configured to generate the first relative positioning map based upon the first time difference of arrival of the first ping signal (e.g., time difference between signal emission time and signal arrival time). In some embodiments, the DI system and/or the first user device is configured to generate the first relative positioning map based upon the first time difference of arrival of the first ping signal and the spatial map of the vehicle. In certain embodiments, the DI system and/or the first user device is configured to generate the first relative positioning map based upon the first time difference of arrival of the first ping signal and the second time difference of arrival of the second ping signal. In some embodiments, the DI system and/or the first user device is configured to generate the first relative positioning map based upon the first time difference of arrival of the first ping signal, the second time difference of arrival of the second ping signal and the spatial map of the vehicle.

According to some embodiments, the DI system and/or the first user device is configured to generate the first relative positioning map based upon the first ping signal and a first echo signal that is an echo signal of the first ping signal. In certain embodiments, the DI system and/or the first user device is configured to generate the first relative positioning map based upon one or more signal parameters of the first ping signal and one or more signal parameters of the first echo signal. In some embodiments, the DI system and/or the first user device is configured to generate the first relative positioning map based upon the first ping signal, the first echo signal, and the spatial map of the vehicle. In certain embodiments, the DI system and/or the first user device is configured to generate the first relative positioning map based upon one or more signal parameters of the first ping signal, one or more signal parameters of the first echo signal, and the spatial map of the vehicle.

Exemplary Embodiments & Functionality

In one aspect, a user computing device for identifying a driver of a vehicle on a trip is provided. The user computing device may be associated with a first vehicle occupant. The user computing device may include at least one processor in communication with a memory device. The at least one processor may be programmed to (i) detect a second user computing device associated with a second vehicle occupant, (ii) initiate a ping exchange process including emitting a set of non-audible sonic ping signals and detecting a set of non-audible sonic ping signals from the second user computing device over a duration of the trip, (iii) generate a relative positioning map of the user computing device with respect to the second user computing device, the relative positioning map including a first position associated with the first vehicle occupant and a second position associated with the second vehicle occupant, (iv) determine, based upon the generated relative positioning map, that the first vehicle occupant is one of the driver and a passenger of the vehicle for the trip, and/or (v) transmit, to a driver identification ("DP") server, a trip report including the determination and the generated relative positioning map.

A further enhancement may be where the at least one processor is further programmed to establish a local peer-to-peer network connection with the second user computing device to coordinate the ping exchange process. The local peer-to-peer network connection may be established over at least one of BLUETOOTH™ Low Energy ("BLE") and ad hoc Wi-Fi. A further enhancement may be where the at least one processor is further programmed to transmit the generated relative positioning map to the second user computing device over the established peer-to-peer connection.

A further enhancement may be where, during the ping exchange process, the at least one processor is further programmed to (a) detect, using a microphone associated with the user computing device, a first ping signal emitted by the second user computing device, (b) emit, in response to detecting the first ping signal, a second ping signal for detection by the second user computing device, and/or (c) measure the time delay between the first ping signal and the second ping signal.

A further enhancement may be where the at least one processor is further programmed to calculate, based upon the generated relative positioning map, a confidence factor associated with the determination. An additional enhancement may be where the at least one processor is further programmed to transmit, to the DI server, the calculated confidence factor along with the trip report when the trip ends. A further enhancement may be where the at least one processor is further programmed to receive, from the second user computing device, data associated with a relative positioning map generated by the second user computing device, and/or update the calculated confidence factor based upon the received data.

A further enhancement may be where the set of non-audible sonic ping signals are high frequency sounds emitted in succession. Each ping signal may be emitted at predefined time increments over a duration of the trip.

In another aspect, at least one non-transitory computer-readable storage media having computer-executable instructions embodied thereon may be provided. When executed by a user computing device associated with a first vehicle occupant of a vehicle, the computer-executable instructions may cause the user computing device to (i) detect a second user computing device associated with a second vehicle occupant. The computer-executable instructions may further cause the user computing device to (ii) initiate a ping exchange process including emitting a set of non-audible sonic ping signals and detecting a set of non-audible sonic ping signals by the user computing device over a duration of the trip. The computer-executable instructions may further cause the user computing device to (iii) generate a relative positioning map of the user computing device with respect to the second user computing device, the relative positioning map including a first position associated with the first vehicle occupant and a second position associated with the second vehicle occupant, (iv) determine, based upon the generated relative positioning map, that the first vehicle occupant is one of a driver and a passenger of the vehicle for the trip, and/or (v) transmit, to a driver identification ("DI") server, a trip report including the determination and the generated relative positioning map. The storage media may include additional, less, or alternate actions, including those discussed elsewhere herein.

A further enhancement may be where the computer-executable instructions cause the user computing device to establish a local peer-to-peer network connection with the second user computing device to coordinate a ping exchange process. A further enhancement may be where the computer-executable instructions cause the user computing device to collect, over the duration of the trip, ping data associated with ping signals emitted and detected by the first user computing device.

In another aspect, a driver identification ("DI") server for identifying a driver of a vehicle on a trip may be provided. The DI server may include at least one processor in communication with a memory device. The at least one processor may be programmed to (i) detect, within the vehicle, a first user computing device associated with a first vehicle occupant and a second user computing device associated with a second vehicle occupant, (ii) initiate a ping exchange process by instructing the detected user computing devices to (a) emit a set of non-audible sonic ping signals and (b) detect a set of non-audible sonic ping signals over a duration of the trip, (iii) receive ping data associated with the ping exchange process from both the first user computing device and the second user computing device, (iv) generate a relative positioning map of the first user computing device with respect to the second user computing device, the relative positioning map including a first position associated with the first vehicle occupant and a second position associated with the second vehicle occupant, and/or (v) determine, based upon the generated relative positioning map, that the first vehicle occupant is one of a driver and a passenger of the vehicle for the trip.

A further enhancement may be where the at least one processor of the DI server is programmed to calculate, based upon the generated relative positioning map, a confidence factor associated with the determination. A further enhancement may be where the at least one processor is further programmed to detect, for the vehicle, when the trip starts and when the trip ends. A further enhancement may be where the set of non-audible sonic ping signals are high frequency sounds emitted in succession. Each ping signal may be emitted at predefined time increments over a duration of the trip.

Examples of Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be needed to find its own structure in unlabeled example inputs.

Examples of Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program Is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A computer-implemented method for identifying occupants of a vehicle, the computer-implemented method comprising:

- receiving, using a sensor associated with a first user device of a first vehicle occupant in the vehicle, an echo signal associated with a first ping signal emitted by the first user device;
- generating a first relative positioning map based upon the echo signal; and determining that the first vehicle occupant is a driver or a passenger of the vehicle based at least in part upon the first relative positioning map.

2. The computer-implemented method of claim 1 further comprising:

receiving vehicle sound data comprising an audio clip of the vehicle; and comparing the audio clip of the vehicle to one or more vehicle audio signatures to identify a type of the vehicle.

3. The computer-implemented method of claim 2 further comprising:

obtaining a spatial map of the vehicle based upon the type of the vehicle, as identified.

4. The computer-implemented method of claim 1 further comprising:

detecting whether one or more other user devices of one or more other occupants are in the vehicle by using data received by at least the sensor associated with the first user device; and upon detecting the one or more other user devices in the vehicle, establishing a peer-to-peer network connection between the first user device and the one or more other user devices in the vehicle, wherein the peer-to-peer network connection is configured to enable the first user device and the one or more other user devices to exchange one or more signals during a vehicle trip.

5. The computer-implemented method of claim 4, wherein the peer-to-peer network connection is further configured to measure a time period during the vehicle trip using at least non-audible sonic ping signals emitted by the first user device or the one or more other user devices.

6. The computer-implemented method of claim 4 further comprising:

utilizing longitudinal data and latitudinal data to determine an orientation of the first user device or the one or more other user devices.

7. The computer-implemented method of claim 4 further comprising:

measuring a linear acceleration or an angular acceleration in real-time during the vehicle trip based on data taken from an accelerometer or gyroscope of the first user device or the one or more other user devices.

8. A system comprising one or more processors and one or more non-transitory computer-readable media storing computing instructions that, when executed on the one or more processors, cause the one or more processors to perform operations comprising:

receiving, using a sensor associated with a first user device of a first vehicle occupant in a vehicle, an echo signal associated with a first ping signal emitted by the first user device;

generating a first relative positioning map based upon the echo signal; and determining that the first vehicle occupant is a driver or a passenger of the vehicle based at least in part upon the first relative positioning map.

9. The system of claim 8, wherein the operations further comprise:

receiving vehicle sound data comprising an audio clip of the vehicle; and comparing the audio clip of the vehicle to one or more vehicle audio signatures to identify a type of the vehicle.

10. The system of claim 9, wherein the operations further comprise:

obtaining a spatial map of the vehicle based upon the type of the vehicle, as identified.

11. The system of claim 8, wherein the operations further comprise:

detecting whether one or more other user devices of one or more other occupants are in the vehicle by using data received by at least the sensor associated with the first user device; and upon detecting the one or more other user devices in the vehicle, establishing a peer-to-peer network connection between the first user device and the one or more other user devices in the vehicle, wherein the peer-to-peer network connection is configured to enable the first user device and the one or more other user devices to exchange one or more signals during a vehicle trip.

12. The system of claim 11, wherein the peer-to-peer network connection is further configured to measure a time period during the vehicle trip using at least non-audible sonic ping signals emitted by the first user device or the one or more other user devices.

13. The system of claim 11, wherein the operations further comprise:

utilizing longitudinal data and latitudinal data to determine an orientation of the first user device or the one or more other user devices.

14. The system of claim 11, wherein the operations further comprise:

measuring a linear acceleration or an angular acceleration in real-time during the vehicle trip based on data taken from an accelerometer or gyroscope of the first user device or the one or more other user devices.

15. One or more non-transitory computer-readable media storing computing instructions that, when executed by one or more processors, cause the one or more processors to perform operations comprising:

receiving, using a sensor associated with a first user device of a first vehicle occupant in a vehicle, an echo signal associated with a first ping signal emitted by the first user device;

generating a first relative positioning map based upon the echo signal; and determining that the first vehicle occupant is a driver or a passenger of the vehicle based at least in part upon the first relative positioning map.

16. The one or more non-transitory computer-readable media of claim 15, wherein the operations further comprise:

receiving vehicle sound data comprising an audio clip of the vehicle; and comparing the audio clip of the vehicle to one or more vehicle audio signatures to identify a type of the vehicle.

17. The one or more non-transitory computer-readable media of claim 16, wherein the operations further comprise:

obtaining a spatial map of the vehicle based upon the type of the vehicle, as identified.

18. The one or more non-transitory computer-readable media of claim 15, wherein the operations further comprise:

detecting whether one or more other user devices of one or more other occupants are in the vehicle by using data received by at least the sensor associated with the first user device; and upon detecting the one or more other user devices in the vehicle, establishing a peer-to-peer network connection between the first user device and the one or more other user devices in the vehicle, wherein the peer-to-peer network connection is configured to enable the first user device and the one or more other user devices to exchange one or more signals during a vehicle trip.

19. The one or more non-transitory computer-readable media of claim 18, wherein the peer-to-peer network connection is further configured to measure a time period during the vehicle trip using at least non-audible sonic ping signals emitted by the first user device or the one or more other user devices.

20. The one or more non-transitory computer-readable media of claim 18, wherein the operations further comprise at least one of:

utilizing longitudinal data and latitudinal data to determine an orientation of the first user device or the one or more other user devices; or measuring a linear acceleration or an angular acceleration in real-time during the vehicle trip based on data taken from an accelerometer or gyroscope of the first user device or the one or more other user devices.

* * * * *